(12) United States Patent
Watanabe et al.

(10) Patent No.: US 8,161,490 B2
(45) Date of Patent: Apr. 17, 2012

(54) STORAGE APPARATUS AND LOAD DISTRIBUTION METHOD

(75) Inventors: Koji Watanabe, Odawara (JP); Sadahiro Sugimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1125 days.

(21) Appl. No.: 12/003,994

(22) Filed: Jan. 4, 2008

(65) Prior Publication Data

US 2008/0184255 A1    Jul. 31, 2008

(30) Foreign Application Priority Data

Jan. 25, 2007  (JP) ................................. 2007-014878

(51) Int. Cl.
  *G06F 9/46* (2006.01)
(52) U.S. Cl. ........................................ 718/105; 718/104
(58) Field of Classification Search ........................ None
  See application file for complete search history.

(56) References Cited

U.S. PATENT DOCUMENTS

| | | | | |
|---|---|---|---|---|
| 5,459,864 | A * | 10/1995 | Brent et al. | 718/105 |
| 5,715,457 | A * | 2/1998 | Wakatani | 718/105 |
| 5,924,097 | A * | 7/1999 | Hill et al. | 707/703 |
| 6,044,435 | A | 3/2000 | Weissmann | |
| 6,647,514 | B1 | 11/2003 | Umberger et al. | |
| 6,725,293 | B1 | 4/2004 | Nakayama et al. | |
| 7,565,656 | B2 * | 7/2009 | Yamasaki et al. | 718/104 |
| 2002/0002578 | A1 * | 1/2002 | Yamashita | 709/105 |
| 2003/0195938 | A1 * | 10/2003 | Howard et al. | 709/208 |
| 2004/0024930 | A1 * | 2/2004 | Nakayama et al. | 710/5 |
| 2004/0098718 | A1 * | 5/2004 | Yoshii et al. | 718/100 |
| 2004/0103254 | A1 * | 5/2004 | Satoyama et al. | 711/150 |
| 2004/0193674 | A1 * | 9/2004 | Kurosawa et al. | 709/201 |
| 2004/0236757 | A1 * | 11/2004 | Caccavale et al. | 707/100 |
| 2005/0081211 | A1 * | 4/2005 | Koga et al. | 718/105 |
| 2005/0102676 | A1 * | 5/2005 | Forrester | 718/105 |
| 2005/0240935 | A1 * | 10/2005 | Ramanathan | 718/105 |
| 2005/0267929 | A1 | 12/2005 | Kitamura | |
| 2006/0123423 | A1 * | 6/2006 | Brenner | 718/105 |
| 2006/0161920 | A1 * | 7/2006 | An et al. | 718/102 |
| 2007/0005818 | A1 | 1/2007 | Tsuruoka et al. | |
| 2007/0061518 | A1 * | 3/2007 | Gotoh | 711/130 |

FOREIGN PATENT DOCUMENTS

| | | |
|---|---|---|
| JP | 2001-167040 | 12/1999 |
| JP | 2001-101149 | 4/2001 |
| JP | 2001-511554 | 8/2001 |
| JP | 2001-290746 | 10/2001 |
| JP | 2004-171172 | 6/2004 |
| JP | 2006-228188 | 8/2006 |
| JP | 2007-011739 | 1/2007 |

* cited by examiner

*Primary Examiner* — Emerson Puente
*Assistant Examiner* — Hiren Patel
(74) *Attorney, Agent, or Firm* — Foley & Lardner LLP

(57) ABSTRACT

A storage apparatus having plural control processors that interpret and process requests sent from a host computer includes a distribution judgment unit for judging, after a control processor receives a request sent from the host computer, whether or not to allocate processing relevant to the request from the control processor that received the request to another control processor, and a control processor selection unit for selecting an allocation target control processor if the distribution judgment unit judges to allocate the processing to another control processor.

10 Claims, 14 Drawing Sheets

FIG.4

| CHANNEL PROCESSOR ID | 1 | 2 | ... | N | } 41A |
|---|---|---|---|---|---|
| ACCEPTANCE PROHIBITION FLAG | 0 | 0 | ... | | } 41B |

| CHANNEL PROCESSOR ID | 1 | 2 | ... | N | } 42A |
|---|---|---|---|---|---|
| ALLOCATION PROHIBITION FLAG | 0 | 1 | ... | | } 42B |

42

| REGULAR WRITE AVERAGE INTERNAL RESPONSE TIME | 2ms | 51A |
| REMOTE COPY AVERAGE INTERNAL RESPONSE TIME | 10ms | 51B |
| AVERAGE INTERNAL RESPONSE TIME | 6ms | 51C |

| CHANNEL PROCESSOR ID | 1 | 2 | ... | N | 52A |
| REGULAR WRITE AVERAGE EXTERNAL RESPONSE TIME | 3ms | 2ms | ... | | 52B |
| REMOTE COPY AVERAGE EXTERNAL RESPONSE TIME | 10ms | 12ms | ... | | 52C |
| SELECTION FLAG | 0 | 1 | ... | | 52D |

FIG.9

| NUMBER OF ALLOCATIONS | 500 | }53A |
| REGULAR WRITE ALLOCATION NUMBER | 200 | }53B |
| REMOTE COPY ALLOCATION NUMBER | 300 | }53C |

| CHANNEL PROCESSOR ID | 1 | 2 | ... | N | }54A |
| ALLOCATION PROHIBITION RESPONSE TIME | 30ms | 30ms | ... | | }54B |
| ALLOCATION RESUMPTION RESPONSE TIME | 60ms | 60ms | ... | | }54C |
| RESUMPTION PROHIBITION FLAG | 0 | 1 | ... | | }54D |

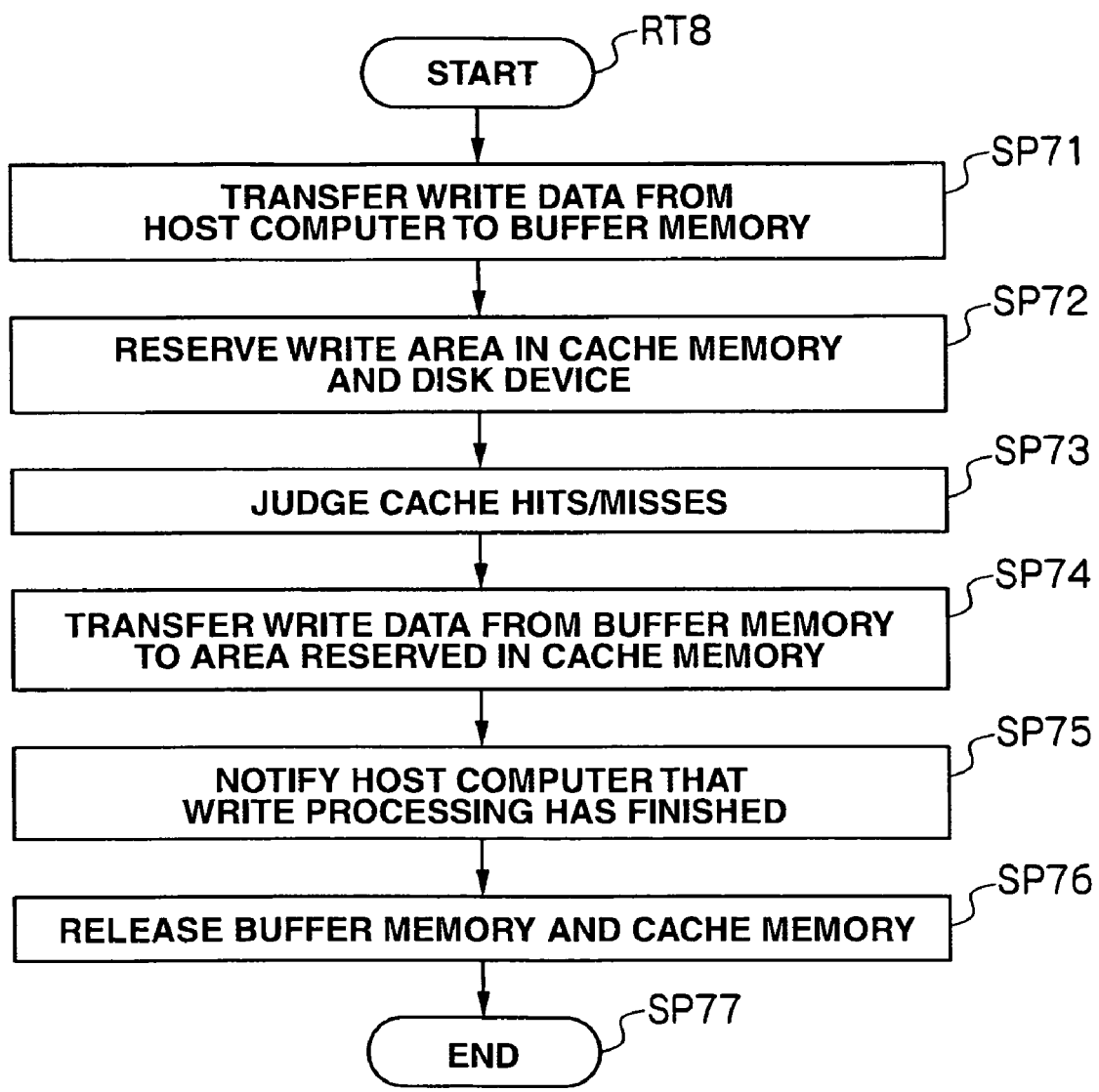

STORAGE APPARATUS AND LOAD DISTRIBUTION METHOD

CROSS-REFERENCE TO RELATES APPLICATIONS

This application relates to and claims priority from Japanese Patent Application No. 2007-014878, filed on Jan. 25, 2007, the entire disclosure of which is incorporated herein by reference.

BACKGROUND

The invention relates to a storage apparatus and a load distribution method. The invention is suited for use in, for example, a storage apparatus having plural microprocessors.

Recently, load distribution techniques, i.e. techniques for distributing the load on microprocessors that process I/O requests sent from a host computer in a storage system, have been put into practical use.

For example, Japanese Patent Laid-Open Publication No. 2001-167040 proposes a storage subsystem in which I/O data transfer is controlled between a slave storage medium and a disk drive according to an I/O request received from an external master device, and that storage subsystem includes at least one external interface controller for each type of interface to each external master device that receives I/O requests, at least one control processor that processes the I/O requests, and a loop having Fibre Channel interfaces provided between the external interface controller and the control processor, the loop functioning as a transmission path for the external interface controller and the control processor.

In a storage subsystem with that configuration, the plural control processors process the I/O requests sent from a host computer in parallel, and the load is distributed among the control processors.

However, because of the overhead caused by the distribution loss generated during the load distribution processing in the above storage subsystem, the response time taken from the reception of an I/O request from a host computer until issue of a notice indicating the data processing relevant to the I/O request is complete, sometimes becomes longer than it would were the control processor that received the request completes the processing by itself.

SUMMARY

The present invention has been made in light of the above problem, and its object is to propose a storage apparatus and load distribution method that can improve overall request processing performance.

To achieve the above stated object, a storage apparatus having plural control processors that interpret and process a request sent from a host computer includes: a distribution judgment unit for judging, after a control processor receives a request sent from the host computer, whether or not to allocate processing relevant to the request to another control processor; and a control processor selection unit for selecting an allocation target control processor if the distribution judgment unit decides to allocate the processing to another control processor.

With that configuration, it is possible to effectively prevent the response time taken to report completion of data processing for a request after receiving the request from the host computer from becoming longer than it would were the control processor that received the request to complete the processing by itself.

Also, a load distribution method in the present invention for a storage apparatus having plural control processors that interpret and process a request sent from a host computer, includes: a first step of judging, after a control processor receives a request sent from the host computer, whether or not to allocate processing relevant to the request from the control processor that received the request to another control processor; and a second step of selecting an allocation target control processor if allocation of the processing to another control processor is decided upon in the first step.

With that configuration, it is possible to effectively prevent the response time taken from the reception of a write request from the host computer 2 until the issue of a notice indicating the write data relevant to the write request is complete longer than it would were the control processor that received the request to complete the processing by itself, due to the overhead caused by the distribution loss during the load distribution processing.

According to the invention, after a control processor receives a request sent from a host computer, whether or not to allocate the request from that control processor to another control processor is decided. If allocation is chosen, the response time taken to report completion of data processing for the request after receiving the request from a host computer can be prevented from becoming longer due to the overhead caused by the distribution loss during the load distribution processing, longer than it would were the control processor that received the request to complete the processing by itself. A storage apparatus and load distribution method able to improve the whole request processing performance is provided.

BRIEF DESCRIPTION OF THE DRAWINGS

FIG. 4 is a schematic diagram illustrating an acceptance prohibition information table.

FIG. 5 is a schematic diagram illustrating a allocation prohibition information table.

FIG. 9 is a schematic diagram illustrating a request allocation tally table.

FIG. 10 is a schematic diagram illustrating an allocation prohibition response time table.

FIG. 17 is a flowchart showing a regular data write processing routine.

DETAILED DESCRIPTION OF PREFERRED EMBODIMENTS

An embodiment of the invention will be described below with reference to the drawings.

Figure 1:
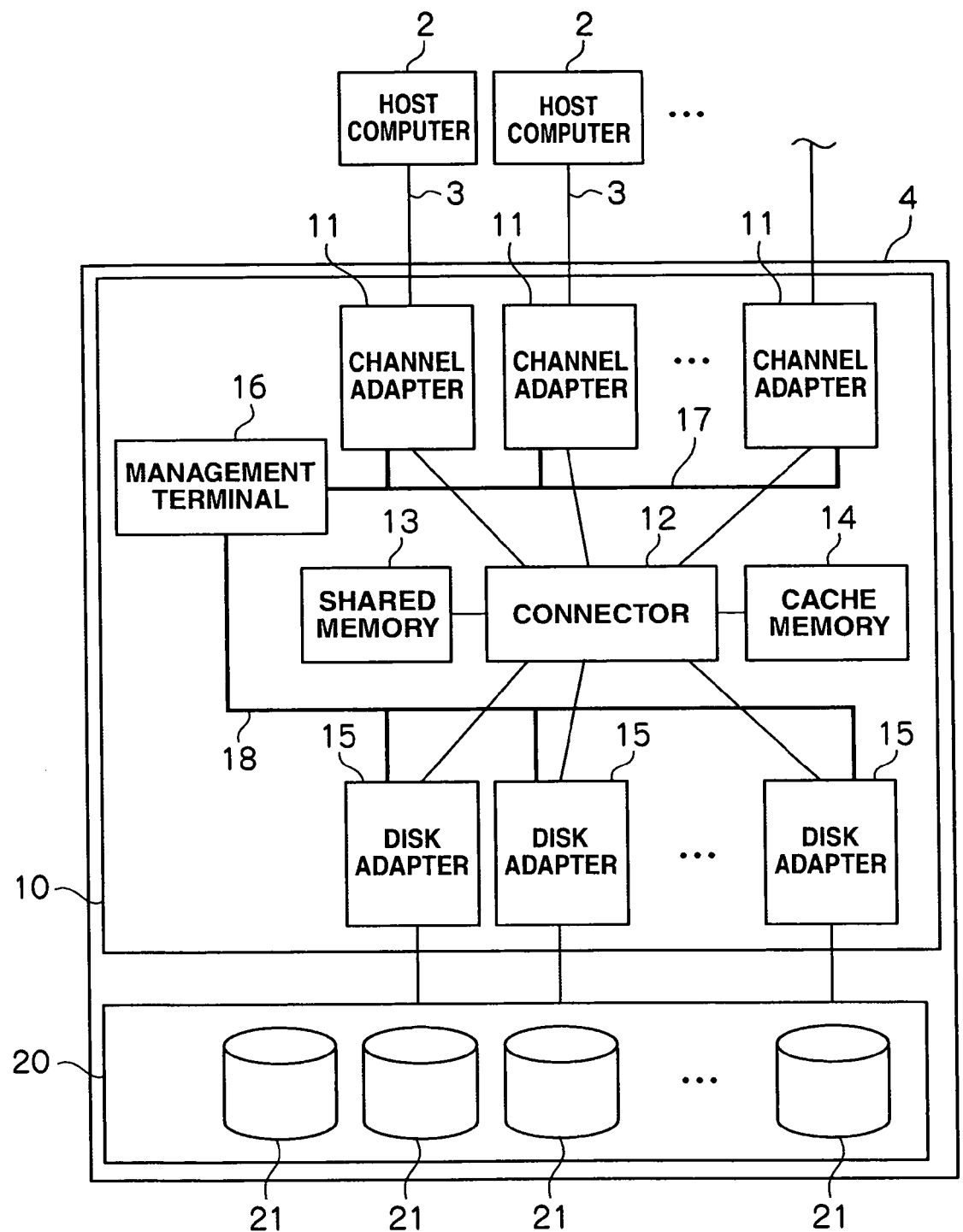
FIG. 1 is a block diagram showing a schematic configuration for a storage system according to an embodiment of the invention

FIG. 1 shows an example of a configuration for a storage system 1 in this embodiment. In the storage system 1, plural host computers 2 are connected to a storage apparatus 4 via networks 3.

Each host computer 2, as a host device, is a computer including information processing resources such as a CPU (central processing unit) and memory, and examples include a personal computer, workstation, and mainframe computer, etc. The host computer 2 also has information input devices (not shown) such as a keyboard, switch, pointing device, and microphone, and information output devices (not shown) such as a monitor display and speaker.

The host computer 2 is designed to send write target data such as files handled by the host computer itself and data write requests (I/O requests) to make the storage apparatus 4 write write target data, data read requests (I/O requests) to make the storage apparatus 4 read read target data such as a file stored in the storage apparatus 4, and remote copy requests to make the storage apparatus 4 execute remote copy for copying read target data stored in the storage apparatus 4 to another storage apparatus (not shown).

The host computer 2 also sends various other requests, including an MRCF (Multiple RAID Coupling Feature) execution request for creating, in the same storage apparatus 4, a replica of a logical volume (explained later) in the storage apparatus 4 as of at a certain point in time, an UR (Universal Replicator) execution request for executing distant remote copy using a journal volume, a QS (Quick Shadow) execution request for restoring, after a software failure, data from the replica prepared at an arbitrary point in time by using a snapshot taken when so instructed, and an AOU (Allocation On Use) execution request for dynamic allocation of a storage area to an area in a write request target logical volume (explained later), etc.

Examples of the network 3 include a SAN (Storage Area Network), LAN (Local Area Network), the Internet, a public line, and a dedicated line. The host computer 2 and the storage system 4 communicates mutually via the network 3 according to Fibre Channel Protocol if the network 3 is a SAN, or according to TCP/IP (Transmission Control Protocol/Internet Protocol) if the network 3 is a LAN.

The storage apparatus 4 has a control unit 10 for controlling data I/O, and a storage device unit 20 including disk devices 21 for storing data.

The control unit 10 includes channel adapters 11, a connector 12, shared memory 13, cache memory 14, disk adapters 15, and a management terminal 16.

Each channel adapter interprets various requests sent from the host computers 2 via the networks 3 and executes relevant processing. The configuration of the channel adapters 11 in this embodiment will be described later with reference to FIG. 2.

The connector 12 is connected to the channel adapters 11, shared memory 13, cache memory 14, and disk adapters 15. The channel adapters 11, shared memory 13, cache memory 14, and disk adapters 15 exchange various kinds of data and requests via the connector 12. The connector 12 is a switch such as an ultra high-speed cross bus switch that transfers data with high speed switching, or a bus.

The shared memory 13 and cache memory 14 are memory shared by the channel adapters 11 and disk adapters 15. The shared memory 13 is used for storing system configuration information concerning the entire storage apparatus 4 configuration, various programs, tables, and requests including I/O requests. An example of the programs and tables stored in the shared memory 13 in this embodiment will be described later with reference to FIG. 4. The cache memory 14 is used mainly for temporarily storing data including write/read data to be input/output to/from the storage apparatus 4.

Each disk adapter 15 is a microcomputer having a microprocessor and memory, etc., and functions as an interface that controls the protocol for communication with the disk devices 21 in the storage device unit 20. The disk adapter 15 is connected to a corresponding disk device in the storage device unit 20 via a Fibre Channel cable, and exchanges data with the disk device 21 according to Fibre Channel Protocol.

The management terminal 16 is a terminal device for controlling the overall operation of the storage apparatus 4, and examples include a notebook personal computer. The management terminal 16 is connected to each channel adapter 11 and each disk adapter 15 via the LANs 17 and 18, respectively. An operator can define system configuration information from the management terminal 16, and store the so defined system configuration information in the shared memory 13 via the channel adapter 11, disk adapters 15, and connector 12.

The disk devices 21 in the storage device unit 20 are expensive disks such as SCSI (Small Computer System Interface) disks, or inexpensive disks such as SATA (Serial AT Attachment) disks or optical disks.

The disk devices 21 in the storage device unit 20 are managed in a RAID (Redundant Arrays of Inexpensive Disks) format by the control unit 10. One or more logical volumes are set in a physical storage area provided by one or more disk devices 21. Data is stored in the logical volume(s) in units of blocks (hereinafter referred to as a "logical block(s)") of a prescribed size.

Each logical volume is provided with a specific identifier (hereinafter referred to as an "LUN" (Logical Unit Number). In this embodiment, data I/O is performed by specifying an address, which is a combination of the LUN and a specific number (LBA: Logical Block Address) each logical block is provided with.

Figure 2:
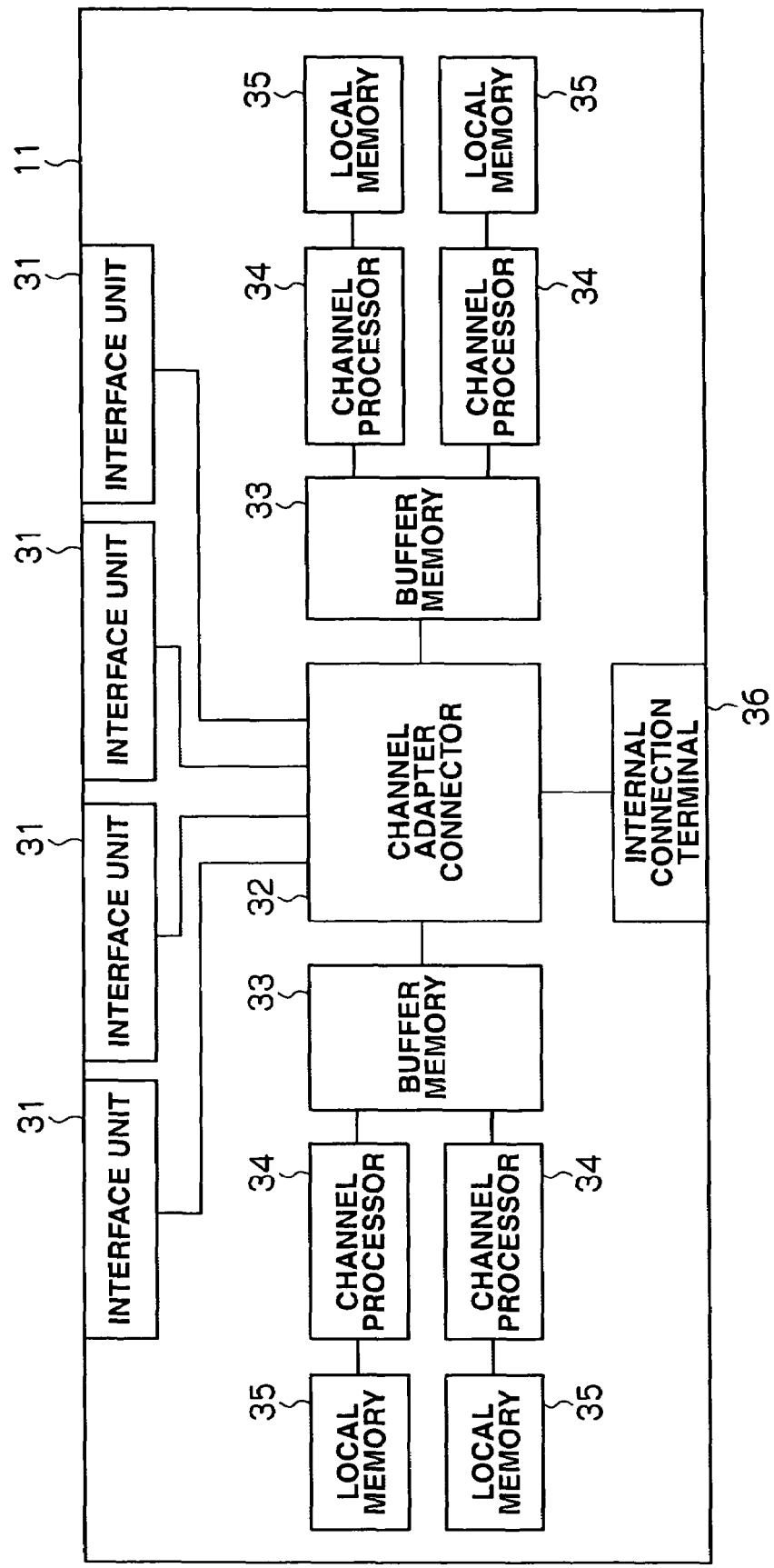
FIG. 2 is a block diagram showing a schematic configuration for a channel adapter.

FIG. 2 shows an example of a configuration for the channel adapter 11. The channel adapter 11 in this embodiment includes plural interface units 31, a channel adapter connector 32, plural buffer memories 33, plural channel processors 34, plural local memories 35, and an internal connection terminal 36.

Each interface unit 31 is connected to the host computer 2 and another storage apparatus (not shown), etc., via the network 3, and transmits/receives various kinds of data and requests. For example, the interface unit 31 receives I/O requests or write data from the host computer 2, and transmits read data to the host computer 2.

The channel adapter connector 32 is connected to the interface units 31, buffer memories 33, and internal connection terminal 36. The interface units 31, buffer memories 33, and internal connection terminal 36 exchange various kinds of data and requests via the channel adapter connector 32. Examples of the channel adapter connector 32 include an OHUB (Optical Hub), which is connected to each component and relays data.

The buffer memories 33 are used for temporarily storing various kinds of data or requests. In this embodiment, two buffer memories 33 are provided respectively on the left and right of the channel adapter connector 32.

Each channel processor 34 interprets various requests stored in the buffer memories 33 and executes relevant processing. In this embodiment, two channel processors 34 are provided outside each of the buffer memories 33 provided respectively on the left and right of the channel adapter connector 32.

The local memories 35 are used for storing various kinds of programs and tables necessary for having the channel processor 34 execute relevant processing for various requests. In this embodiment, the local memories 35 are provided outside each channel processor. An example of the programs and tables stored in the local memories 35 in this embodiment will be described later with reference to FIG. 6.

The internal connection terminal 36 is connected to the connector 12, and delivers various kinds of data and requests exchanged between the connector 12 and channel adapter connector 32.

Figure 3:
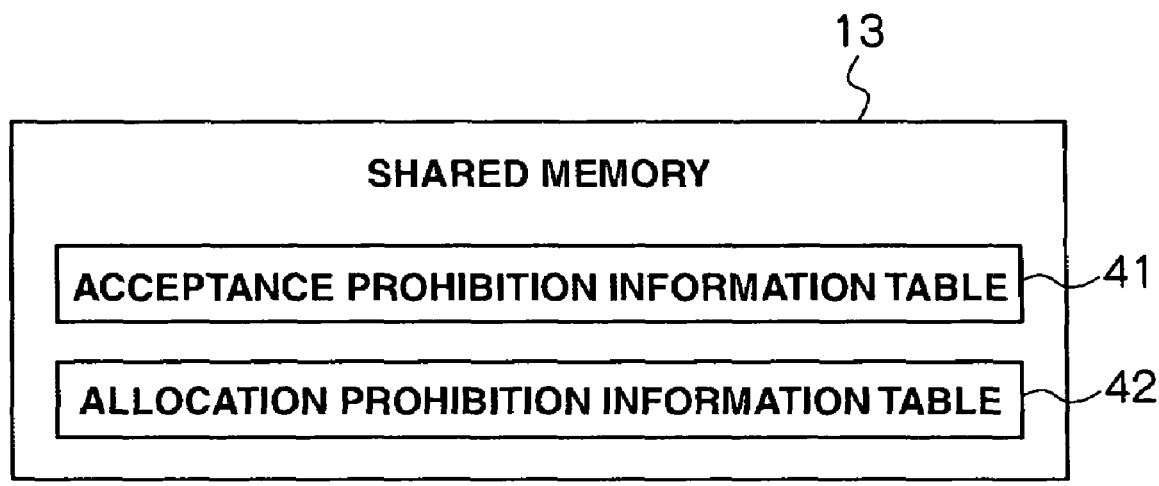
FIG. 3 is a block diagram showing a schematic configuration for shared memory.

FIG. 3 shows an example of the tables stored in the shared memory 13 in the storage apparatus 4. The shared memory 13 in the storage apparatus 4 stores an acceptance prohibition information table 41 for managing whether or not each channel processor 34 can accept allocation due to distribution processing, and an allocation prohibition information table 42 for managing whether or not new allocation for distribution processing can be added to each channel processor 34.

FIG. 4 shows an example of a configuration for the acceptance prohibition information table 41. The acceptance prohibition information table 41 includes channel processor ID entries 41A that indicate channel processor IDs, which are identifiers for identifying each of the channel processors 34 in all channel adapters 11, and acceptance prohibition flag entries 41B that indicate the ON/OFF status of acceptance prohibition flags.

If "1" is stored as an acceptance prohibition flag entry 41B corresponding to a channel processor 34, the acceptance prohibition flag is ON, so acceptance of allocation due to distribution processing for the channel processor 34 is prohibited, and the channel processor 34 is overlooked as an allocation target in the distribution processing. Meanwhile, if "0" is stored, the acceptance prohibition flag is OFF, so allocation due to distribution processing to that channel processor 34 can be accepted, and the channel processor 34 is included in the allocation targets in the distribution processing.

When an acceptance prohibition flag entry 41B corresponding to a channel processor 34 is to be changed to "1," it is possible that a failure may have occurred in that channel processor 34, and so that channel processor 34 may not be able to change by itself the value stored as the entry. Accordingly, if another channel processor 34 tries to access the defective channel processor 34 but access cannot be made, another channel processor 34 forcibly changes the acceptance prohibition flag entry 41B corresponding to the defective channel processor 34 to "1".

Meanwhile, if "1" is stored as the acceptance prohibition flag entry 41B corresponding to a channel processor 34 but that channel processor 34 has already recovered from the failure, the channel processor 34 changes its own acceptance prohibition flag entry 41B to "0."

FIG. 5 shows an example of a configuration for the allocation prohibition information table 42. The allocation information table 42 includes channel processor ID entries 42A that indicate the channel processor IDs, and allocation prohibition flag entries 42B that indicate the ON/OFF status of the allocation prohibition flag.

If "1" is stored as an allocation prohibition flag entry 42B corresponding to a channel processor 34, the allocation prohibition flag is ON, and that channel processor 34 prohibits allocation due to distribution processing and is overlooked as a subsequent allocation target in the distribution processing. Meanwhile, if "0" is stored as an allocation prohibition flag entry 42B corresponding to a channel processor 34, the allocation prohibition flag is OFF and the allocation due to distribution processing cannot be added to that channel processor 34.

Each channel processor 34 handles not only the requests the channel processor 34 receives directly from the host computer 2, but also the requests allocated from any other channel processor 34 due to distribution processing. Therefore, depending on the amount of requests the channel processor 34 receives directly from the host computer 2, the internal channel processor response time (explained later) during the distribution processing may drastically increase unless allocation due to distributed processing from another channel processor 34 is prohibited.

Accordingly, each channel processor 34 changes the allocation prohibition flag entry 42B corresponding to its own channel processor 34 to "1" if, for example, its operating rate exceeds a prescribed threshold, or if the internal channel processor response time (explained later) during the distribution processing exceeds a prescribed threshold.

Also, when "1" is stored as the allocation prohibition flag entry 42B corresponding to a channel processor 34, that channel processor 34 changes its allocation prohibition flag 42B to "0" if the operating rate in the channel processor 34 is equal to or less than a prescribed threshold, or the internal channel processor response time (explained later) during the distribution processing is equal to or less than a prescribed threshold.

Each channel processor 34 is designed to be able to calculate its own operating rate and internal channel processor response time (explained later) and manage the operating rate and internal channel processor response time thresholds.

Figure 6:
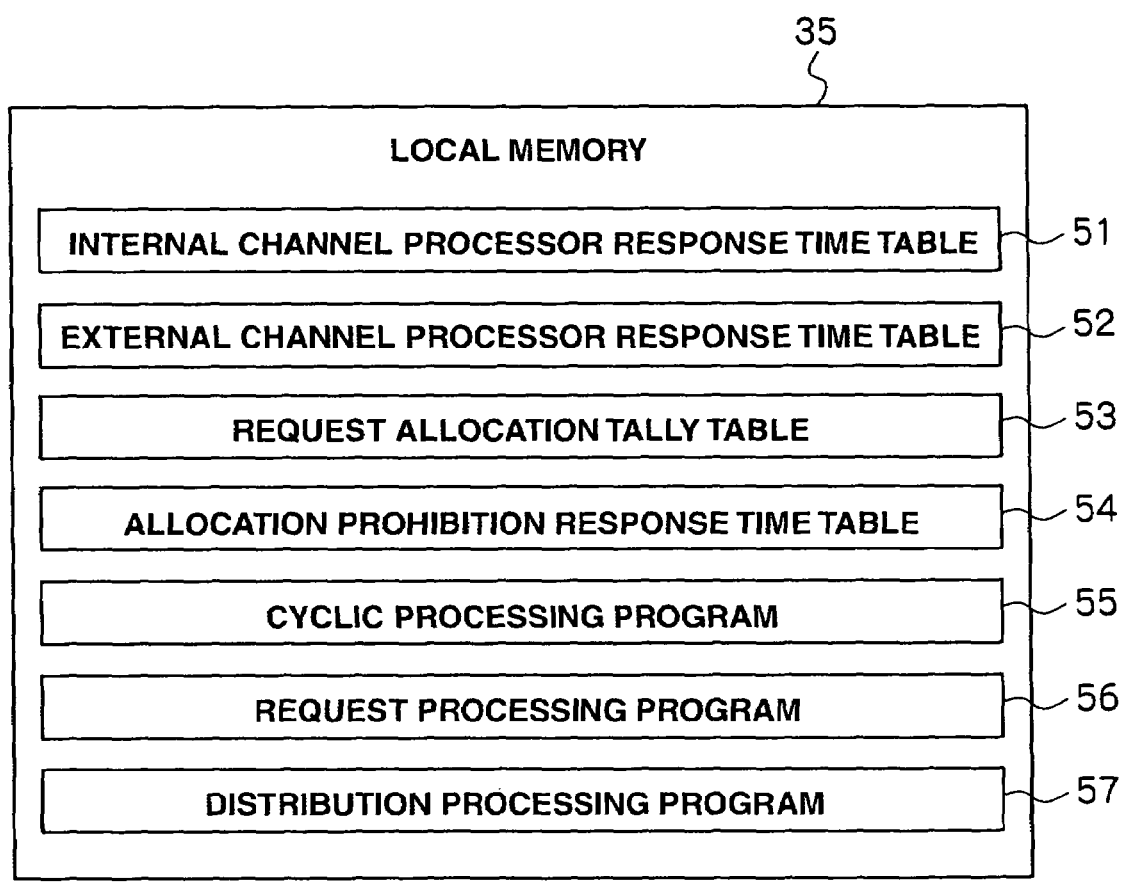
FIG. 6 is a block diagram showing a schematic configuration for local memory.

FIG. 6 shows an example of the tables stored in each local memory 35 in the channel adapter 11 in the storage apparatus 4. Each local memory 35 stores an internal channel processor response time table 51 for managing the internal channel processor response time, which is the time taken from when the channel processor 34 starts processing relevant to a request until when the processing ends; an external channel processor response time table 52 for managing external channel processor response time, which is the time taken from when the channel processor 34 allocates processing relevant to a request to another channel processor 34 due to distribution processing until when that processing ends; a request allocation tally table 53 for managing the number of requests with processing allocated to another channel processor 34 due to distribution processing in the total number of requests sent from the host computer 2 during a prescribed time cycle; and an allocation prohibition response time table 54 for managing allocation prohibition response time, which is the time within which allocation due to distribution processing is prohibited.

Each local memory 35 also stores a cyclic processing program 55 for calculating the total number of request allocations, the number of data write allocations, which is the number of times data write requests are allocated to another channel processor in the number of request allocations, and the number of remote copy allocations, which is the number of times remote copy requests are allocated to another channel processor; a request processing program 56, which is a program for interpreting and processing the requests sent from the host computer 2; and a distribution processing program 57, which is a program for executing various kinds of processing included in the distribution processing.

Figure 7:
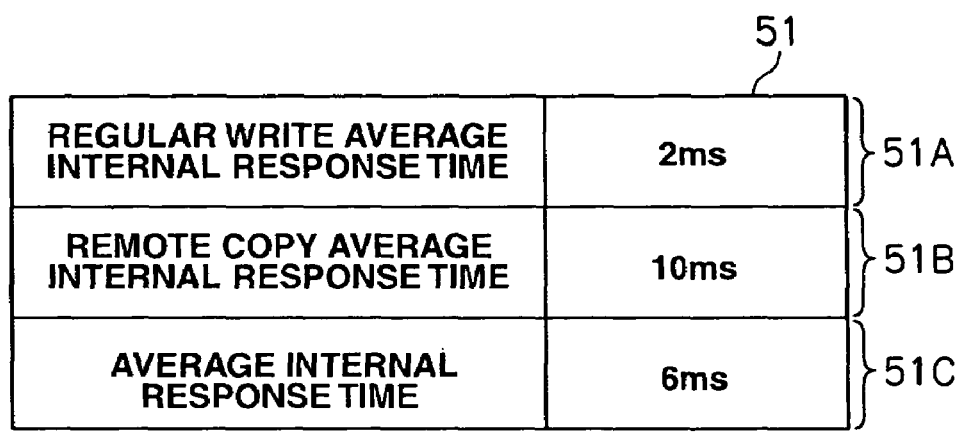
FIG. 7 is a schematic diagram illustrating a channel processor's response time table.

FIG. 7 shows an example of a configuration for the internal channel processor response time table 51. The internal channel processor response time table 51 contains a regular write average internal response time entry 51A for managing the regular write average response time, which is the channel processor 34's own average response time for processing relevant to a regular write request; a remote copy average internal response time entry 51B for managing the remote copy average response time, which is the channel processor 34's own average response time for processing relevant to a remote copy request; and average internal response time entry 51C for managing the average internal response time, which is the channel processor 34's own average response time for processing relevant to all requests.

Each channel processor 34 records, in association with the requests sent from the host computer 2, the resulting values for the internal channel processor response time, which are the actual times taken from start to finish for relevant processing for actual requests.

Figure 8:
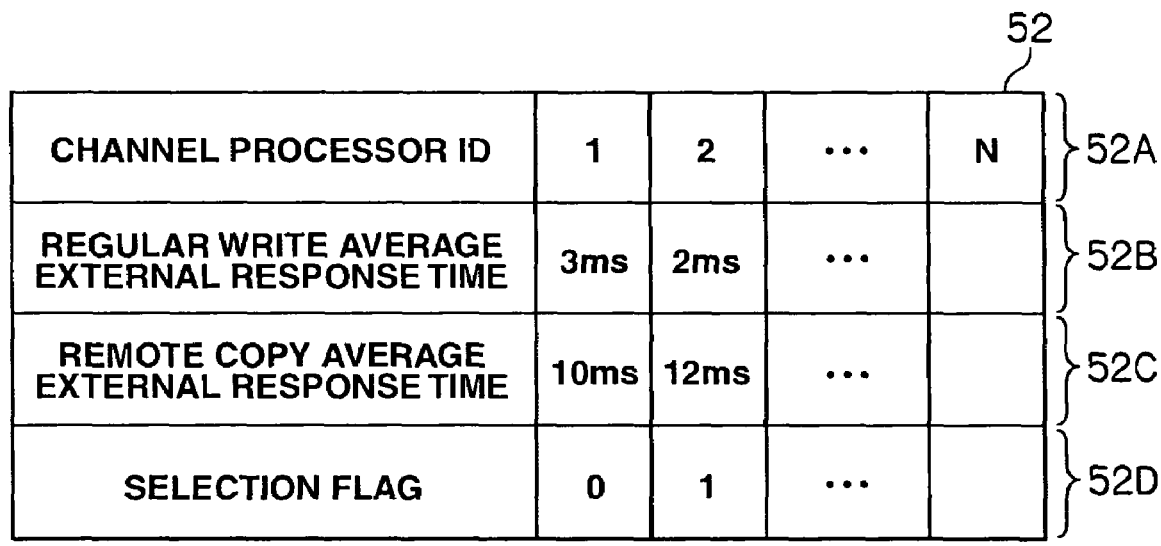
FIG. 8 is a schematic diagram illustrating an external channel processor's response time table.

FIG. 8 shows an example of a configuration for the external channel processor response time table 52. The external channel processor response time table 52 contains channel processor ID entries 52A for managing the channel processor IDs other than the channel processor 34's own ID; regular write average external response time entries 52B for managing the regular write average external response time, which is the average channel processor response time for other channel processors for processing relevant to a regular write request; remote copy average external response time entries 52C for managing the remote copy average external response time, which is the average response time for other channel processors for processing relevant to a remote copy request; and selection flag entries 52D for managing the ON/OFF status of the selection flags.

Each channel processor 34 records, in association with the requests sent from the host computer 2, the resulting values for the external channel processor response time, which are the actual times taken from when processing relevant to a request is allocated to another channel processor 34 until the end of processing. The external channel processor response time table 52 is used for comparison between the regular write average response time, the remote copy average response time for the channel processor 34 and those for the other channel processors 34.

If "1" is stored as the selection flag entry 52D corresponding to a channel processor 34, the selection flag is ON, and that channel processor 34 has already been selected as an allocation target for distribution processing and will be overlooked as a subsequent allocation target. Meanwhile, if "0" is stored as the selection flag entry 54D corresponding to a channel processor 34, the selection flag is OFF and that channel processor 34 cannot be selected as an allocation target for the distribution processing.

FIG. 9 shows an example of a configuration for the request allocation tally table 53. The request allocation tally table 53 contains an allocation tally entry 53A for managing the number of allocations; a write allocation tally entry 53B for managing the number of times write requests are allocated to another channel processor 34; and a remote copy allocation tally entry 53C for managing the number of times remote copy requests are allocated to another channel processor 34.

FIG. 10 shows an example of a configuration for the allocation prohibition response time table 54. The allocation prohibition response time table 54 contains channel processor ID entries 54A for managing IDs of the channel processors other than the channel processor that received a given request; allocation prohibition response time entries 54B for managing the allocation prohibition response times; allocation resumption response time entries 54C for managing the allocation resumption response times—if another channel processor 34's response time has exceeded the allocation resumption response time, the channel processor 34 that received the request resumes accepting allocation for the distribution processing from another channel processor even if that channel processor 34's response time exceeded the allocation prohibition response time; and resumption prohibition flag entries 54D for managing the ON/OFF status of the resumption prohibition flags.

If "1" is stored as a resumption prohibition flag entry 54D corresponding to a channel processor 34, the resumption prohibition flag is "ON," so the relevant channel processor 34 is overlooked as a distribution processing allocation target, and the allocation for distribution processing from another channel processor 34 is not resumed even if the response time of another channel processor 34 exceeds the allocation resumption response time. Meanwhile, if "0" is stored as a resumption prohibition flag entry 54D corresponding to a channel processor 34, the resumption prohibition flag is OFF. If the response time in a channel processor 34 exceeds the allocation resumption response time, "1" stored as the allocation prohibition flag entry 42B corresponding to a channel processor 34 with an OFF resumption prohibition flag is changed to "0," and this channel processor 34 resumes accepting allocation due to distribution processing from the channel processor 34 with the response time that exceeds the allocation resumption response time.

In other words, the allocation prohibition response time table 54 indicates two thresholds, i.e., the allocation prohibition response time and allocation resumption response time. Each channel processor 34 can determine when to reduce a load on another channel processor 34 by referring to the external channel processor response time table 52.

If a load on a channel processor 34 is desired to be kept low, the threshold of the allocation prohibition response time for that channel processor 34 is set to prohibit allocation from another channel processor 34.

If the response time in another channel processor 34 exceeds the allocation resumption response time and becomes overloaded, channel processors 34 having an OFF resumption prohibition flag are searched for by referring to the allocation prohibition response time table 54, and the allocation prohibition flags of the relevant channel processors 34 are set to OFF. By doing so, the channel processors 34 with their allocation prohibition flags set to OFF resumes accepting the allocation for the distribution processing for the channel processor 34 with the response time that exceeded the allocation prohibition response time.

For example, assume the allocation prohibition response time and allocation resumption response time of a second channel processor 34 are set respectively to 30 ms and 60 ms relative to a first channel processor 34. The first channel processor begins the distribution processing. If the internal channel processor response time of the second channel processor exceeds 30 ms, the second channel processor 34 sets its own allocation prohibition flag to ON to prohibit accepting allocation for distribution processing. However, if the internal channel processor response time of the first channel processor 34 exceeds 60 ms, the second channel processor 34 sets its own allocation prohibition flag to OFF and resumes accepting allocation for distribution processing.

In this way, by controlling the channel processors 34 so that their loads are kept low, any increase in the internal channel processor response time caused by a sudden increase in the number of requests can be handled. Also, an operator can set the load on a channel processor 34 as one to be kept low, and also reduce the load in an overloaded channel processor 34.

Figure 11:
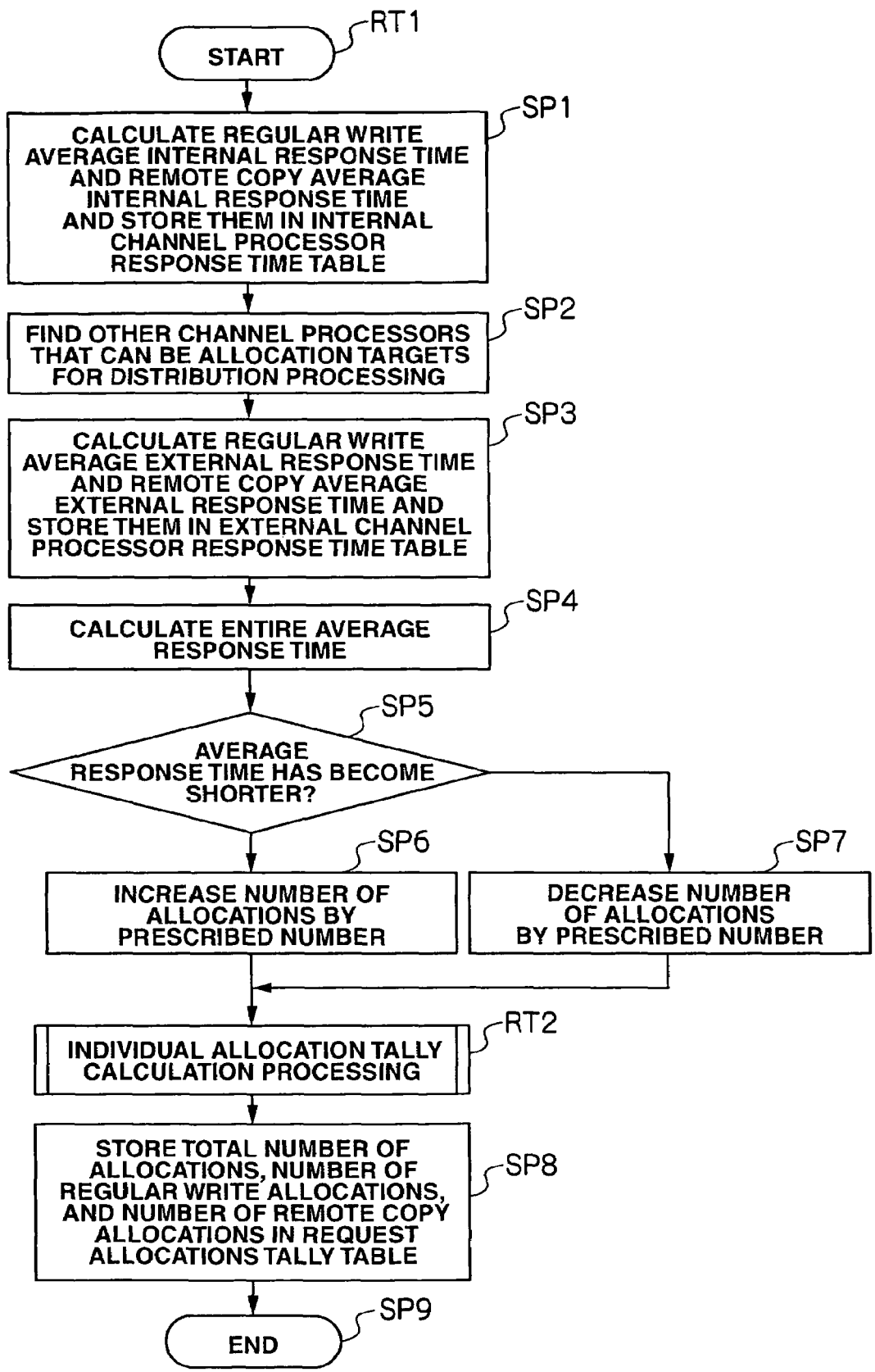
FIG. 11 is a flowchart showing a time cyclic processing routine.

FIG. 11 shows an example of a flowchart showing a specific routine relating to cyclic processing for the storage apparatus 4 in the storage system 1 performed by a channel processor 34.

After the storage apparatus 4 is started up, the channel processor 34 executes a cyclic processing program included in the cyclic processing program 55 every prescribed time cycle, e.g. every several seconds, according to the cyclic processing routine RT1 shown in FIG. 11, to calculate the regular write average internal response time, remote copy write average internal response time, and average internal response time based on the requests sent from the host computer 2 and the resulting values for the internal channel processor response times during the time period from the end of the previous cyclic processing until the beginning of the current cyclic processing, and store those calculated values in the internal channel processor response time table 51 (SP1).

Next, the channel processor 34 finds the other channel processors 34 with the acceptance prohibition and allocation prohibition flags not ON, i.e. that can be allocation targets for distribution processing, by referring to the acceptance prohibition information table 41 and allocation prohibition information table 42 (SP2).

Next, the channel processor 34 calculates the regular write average external response time and remote copy write average external response time based on the requests sent from the host computer 2 and the resulting values for the external channel processor response times during the time period from the end of the previous cyclic processing until the start of the current cyclic processing stored for each of the other channel processors 34, and stores those calculated values in the external channel processor response time table 52 (SP3).

Subsequently, the channel processor 34 calculates the entire average response time based on the regular write average external response time, remote copy write average external response time, and average external response time of the other channel processors 34 (SP4).

Subsequently, the channel processor 34 compares the above calculated entire average response time with the previous entire average response time stored in that channel processor 34 and checks whether or not the current average response time is shorter (SP5).

If the current average response time is shorter (SP5: YES), the channel processor 34 judges that to be the result of execution of the processing for distributing its load, and so increases, by the prescribed number of times (e.g., by 5-10% of the number of allocations), the number of allocations in the total number of requests sent from the host computer 2 during the time period from the end of the previous cyclic processing until the start of the current cyclic processing (SP6).

Meanwhile, if the current average response time is longer (SP5: NO), the channel processor 34 finds that the average response time has worsened in spite of execution of the processing for reducing its load, resulting in the opposite effect. Therefore, the channel processor 34 reduces, by the prescribed number of times (e.g. by 5-10% of the number of allocations), the number of allocations in the total number of the requests sent from the host computer 2 during the time period from the end of the previous cyclic processing until the start of the current cyclic processing (SP7).

The initial number of allocations may be set by the operator, or in various other ways.

Next, the channel processor 34, after increasing or decreasing the number of allocations by the prescribed number, executes an individual allocation tally calculation processing routine RT2. The individual allocation tally calculation processing routine RT2 will be described later with reference to FIG. 12.

Subsequently, the channel processor 34 stores, in the request allocation tally table 53, the total number of allocations, and the number of regular write allocations and the number of remote copy allocations calculated by the individual allocation tally calculation processing routine RT2 (SP8).

After that, the channel processor 34 ends the cyclic processing routine shown in FIG. 11 (SP9).

In this way, the channel processor 34 can use feedback from the result of execution of the processing relevant to the requests to vary the number of allocations, and thus optimize the processing relevant to the requests performed in that channel processor 34.

Figure 12:
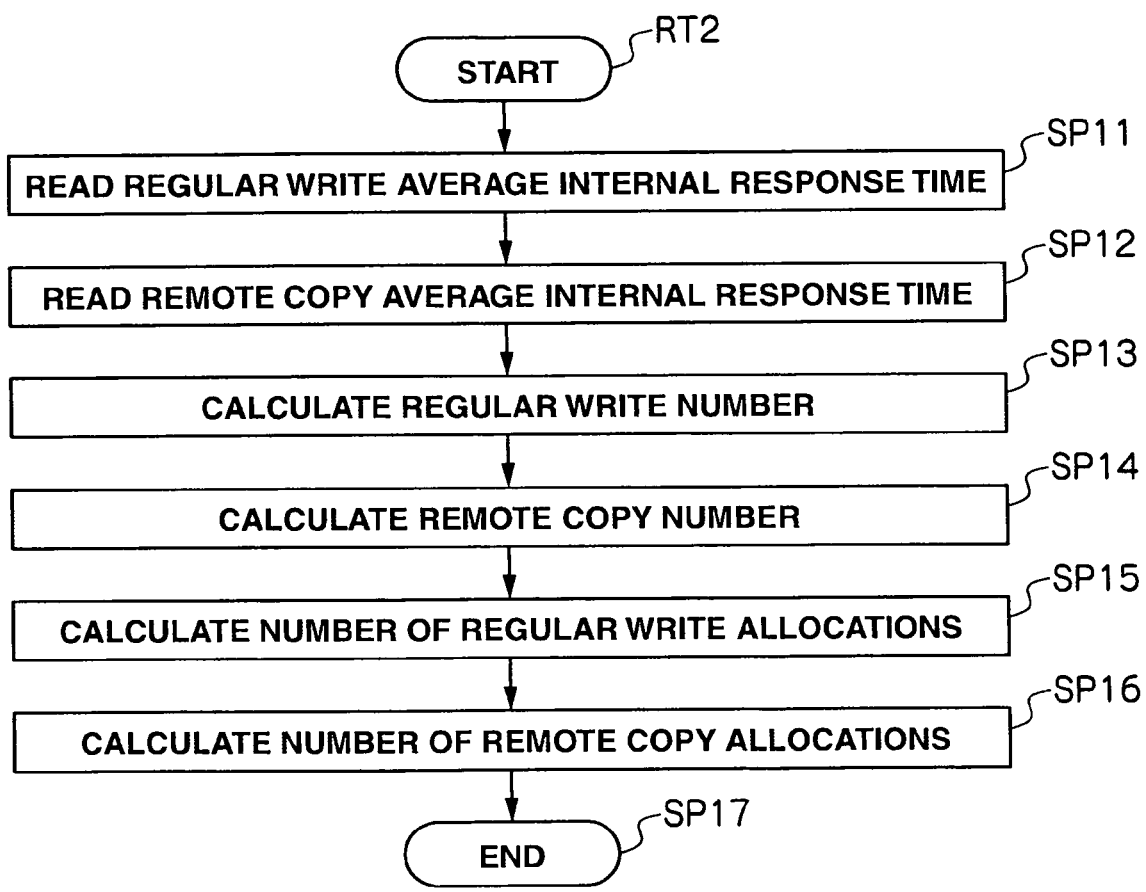
FIG. 12 is a flowchart showing an individual allocation tally calculation processing routine.

FIG. 12 shows an example of a flowchart showing a specific routine relating to the individual allocation tally calculation processing in the storage apparatus 4 in the storage system 1 performed by the channel processor 34.

The channel processor 34, after increasing/decreasing the number of allocations by the prescribed number, executes, according to the individual allocation tally calculation processing routine RT2 shown in FIG. 12, the individual allocation tally calculation processing program, included in the cyclic processing program 55, for calculating the number of times each type of request in the total number of allocations is allocated, and reads the regular write average internal response time stored in the internal channel processor response time table 51 (SP11).

Subsequently, the channel processing 34 reads the remote copy average internal response time stored in the internal channel processor response time table 51 (SP12).

The channel processor 34 then calculates the regular write number, i.e. the number of regular write requests in the total number of requests based on the requests sent from the host computer 2 associated with the resulting values for the internal channel processor response time, which is the actual time taken from start to finish for processing relevant to the request (SP13).

Subsequently, the channel processor 34 calculates the remote copy number, which is the number of remote copy requests in the total number of requests, based on the requests sent from the host computer 2 associated with the resulting values for the internal channel processor response times (SP14).

Subsequently, the channel processor 34 calculates the number of regular write allocations based on the regular write average internal response time, remote copy average internal response time, and the number of regular write allocations (SP15).

Given a regular write average internal response time of "V," a remote copy average internal response time of "v," and the number of regular write allocations "T," the channel processor 34 can calculate the percentage of regular write allocations "X" according to the following Formula 1:

$$X = \frac{T}{\frac{V}{V+v}} (\%) \qquad \text{Formula 1}$$

Next, the channel processor 34 calculates the number of remote copy allocations based on the regular write average internal response time, remote copy average internal response time, and the number of remote copy allocations (SP16).

Given a regular write average internal response time of "V," a remote copy average internal response time of "v," and the number of remote copy allocations of "t," the channel processor 34 can calculate the percentage of remote copy allocations "Y" according to the following Formula 2:

$$X = \frac{t}{\frac{V}{V+v}} (\%) \qquad \text{Formula 2}$$

After that, the channel processor 34 ends the individual allocation tally calculation processing routine RT2 shown in FIG. 12 (SP17).

The average response time greatly differs between regular write requests and remote copy requests. Therefore, since the average response time for the processing for a remote copy request is longer, a better distribution effect is obtained by allocating the remote copy requests to another channel processor 34 prior to the regular write requests. Therefore, the channel processor 34 calculates the respective numbers of regular write and remote copy allocations based on the ratio of the respective number of regular write and remote copy requests and the internal response times for the processing relevant to those requests.

Although the above described embodiment concerns the calculation of the number of times regular write requests and remote copy requests are allocated to another channel processor 34, the present invention is not limited to that calculation. If the response time differs greatly between various requests, such as the above mentioned MRCF, UR, QS, and AOU requests, the number of times the respective types of requests are allocated to another channel processor 34 can be calculated in similar fashion based on the respective response times and the numbers of the respective types of requests. Of course, the programs and tables in the invention can be modified as necessary when used for calculations relating to those various requests.

Figure 13:
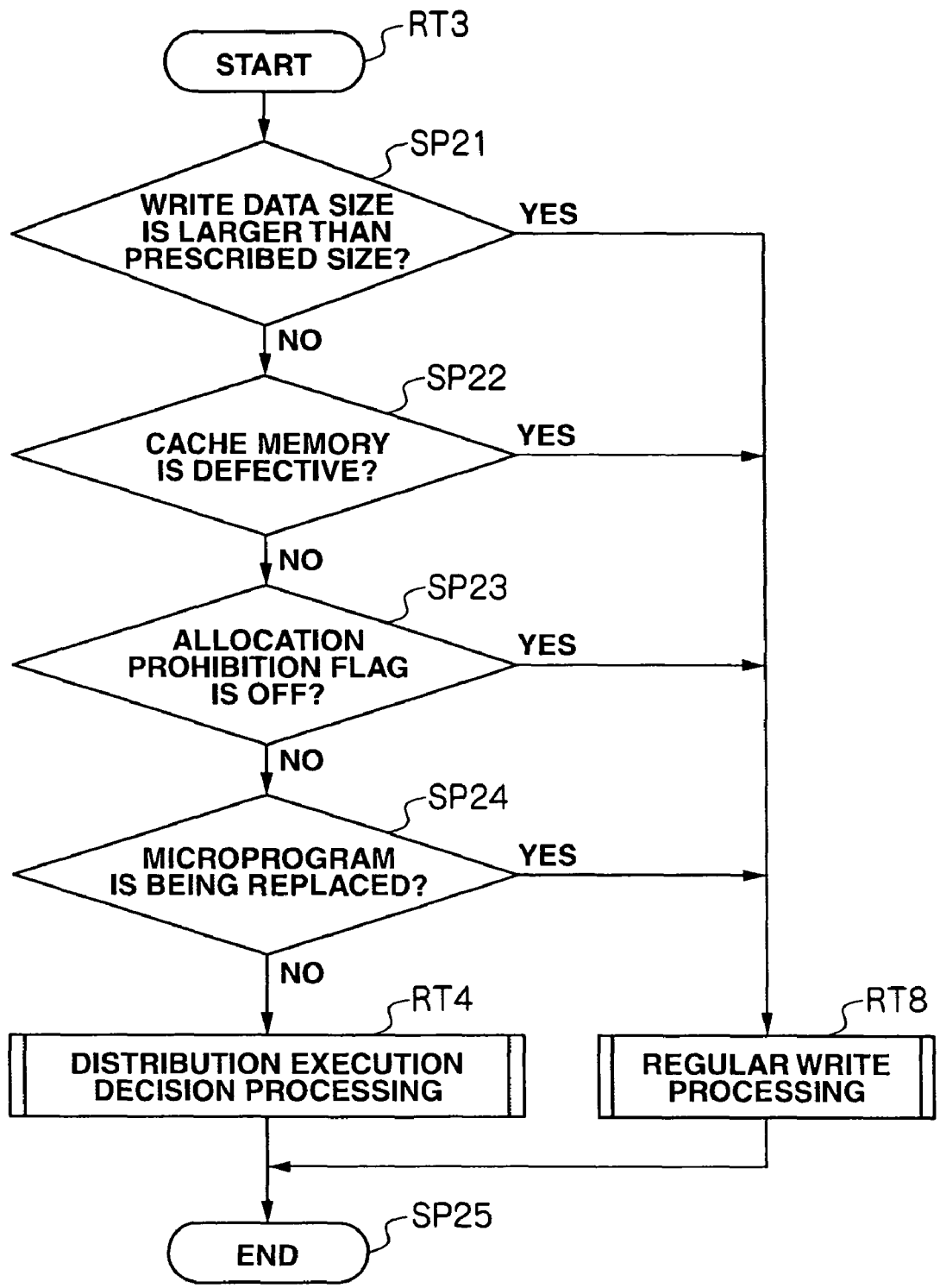
FIG. 13 is a flowchart illustrating a distribution execution judgment processing routine.

FIG. 13 shows an example of a flowchart showing a specific routine relating to the dispersion execution judgment processing performed by the channel processor 34 in the storage apparatus 4 in the storage system 1.

Although the following explanation relates to the write processing performed if a regular write request is sent from the host computer 2, the same processing is performed for processing relevant to various other requests such as the remote copy, MRCF, UR, QS, and AOU requests, except for the content of RT8, which is different.

After a write request is sent from the host computer 2, the channel processor 34 executes, according to the routine RT3 shown in FIG. 13, the dispersion execution judgment processing program included in the dispersion program 57, and checks whether or not the size of the write data is larger than a prescribed size (SP21).

If the write data is larger than the prescribed size (SP21: YES), data transfer performed during the distribution processing may become complicated. Accordingly, the channel processor 34 terminates the distribution processing, executes a regular write processing routine RT8 (explained later) and ends the routine RT3 shown in FIG. 13.

More specifically, if the write data size is larger than 1 MB, the size exceeds the capacity of the buffer memory 33 connected to the relevant channel processor 34. Therefore, the channel processor 34 terminates the distribution processing because data transfer is complicated.

Meanwhile, if the write data size is equal to or less than the prescribed data size (SP21: NO), the channel processor 34 checks whether or not the cache memory 14 is defective or not (SP22).

If the cache memory 14 is defective (SP22: YES), the buffer memory 33 may be released; or a package in the cache memory 14 may be replaced afterwards. Accordingly, the channel processor 34 terminates the distribution processing, executes the regular write processing routine RT8 (explained later), and ends the routine RT3 shown in FIG. 13.

Meanwhile, if the cache memory 14 is not defective (SP22: NO), the channel processor 34 checks whether or not the allocation prohibition flag corresponding to the relevant channel processor 34 is OFF (SP23).

If the allocation prohibition flag corresponding to the channel processor 34 is OFF (SP23: YES), the channel processor 34 is not a bottleneck because the average internal response time of that channel processor 34 does not exceed the allocation prohibition response time. Accordingly, as no effect can be expected from the distribution processing, the channel processor 34 terminates the distribution processing, executes the regular write processing routine RT8 (explained later), and ends the routine RT3 shown in FIG. 13 (SP25).

Meanwhile, if the allocation prohibition flag corresponding to that channel processor 34 is not OFF, i.e. the flag is ON (SP23: NO), the channel processor 34 checks whether or not the microprogram in the channel processor 34 is currently being replaced (SP24).

If the microprogram in the channel processor 34 is being replaced (SP24:YES), the channel processor 34 may be rebooted after the replacement of the microprogram. Accordingly, the channel processor 34 terminates the distribution processing, executes the regular write processing routine RT8 (explained later), and ends the routine RT3 shown in FIG. 13 (SP25).

Meanwhile, if the microprogram in the channel processor 34 is not being replaced (SP24: NO), the channel processor 34 judges that the distribution processing can be executed without problem, executes a distribution execution decision processing routine RT4 (explained later), and ends the routine RT3 shown in FIG. 13 (SP25).

Figure 14:
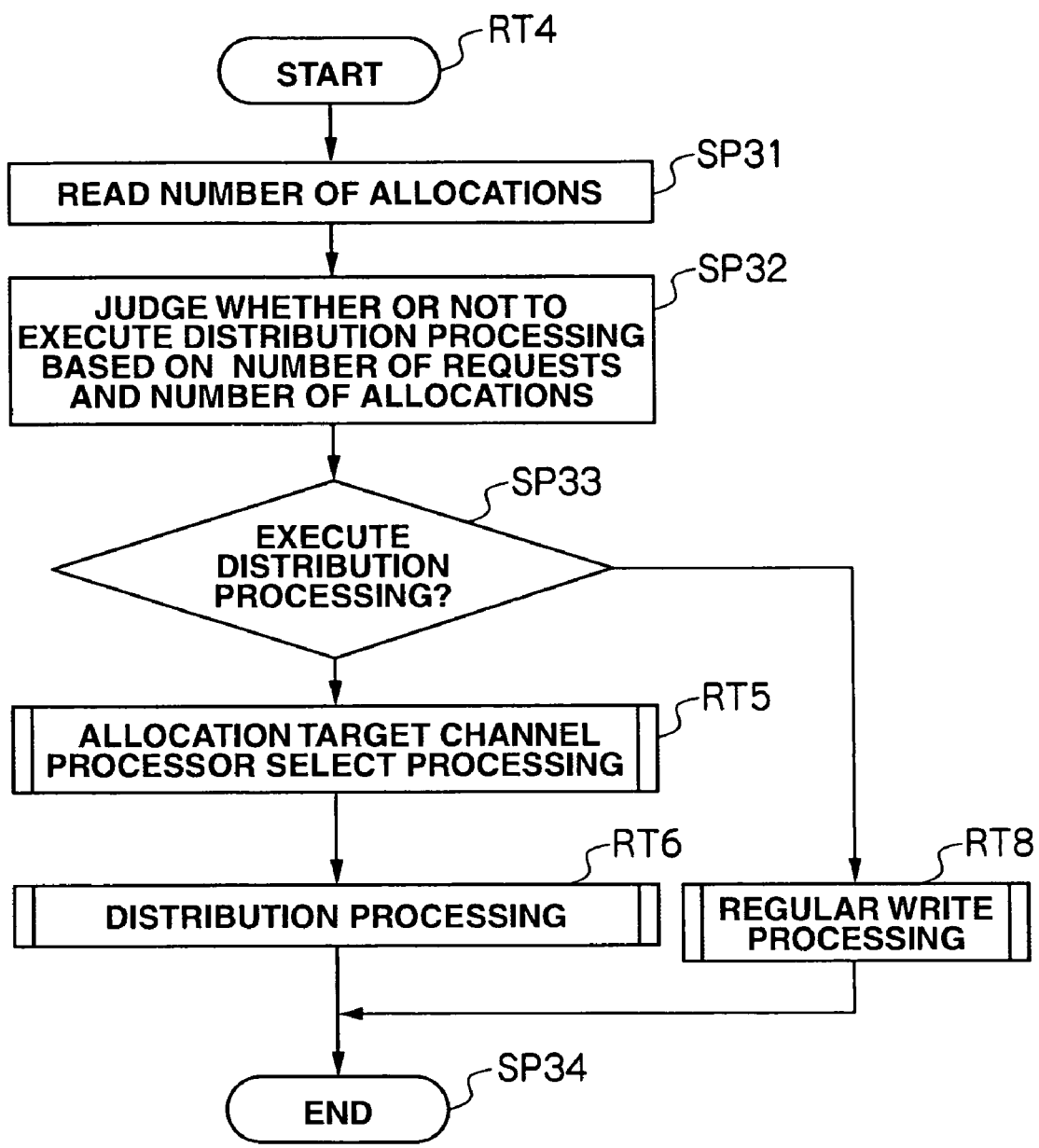
FIG. 14 is a flowchart showing a distribution execution decision processing routine.

FIG. 14 shows an example of a flowchart showing a specific routine relating to the dispersion execution determination processing performed by the channel processor 34 in the storage apparatus 4 in the storage system 1.

After it is judged that the distribution processing should be executed, the channel processor 34 executes the dispersion execution determination processing program included in the distribution processing program 57 according to the routine RT4 shown in FIG. 14, and reads the number of allocations by referring to the request allocation tally table 53 (SP31).

Next, the channel processor 34 judges whether or not to execute the distribution processing based on the number of requests and the number of allocations (SP32).

In that step, given the number of requests of "W" and the number of allocations of "w" and the ratio of the number of times of distribution processing execution of "Z," the channel processor 34 can determine to execute the distribution processing at the ratio of "Z," which is ratio of the number of distribution processing executions, according to the following Formula 3:

$$Z = \frac{w}{W} \qquad \text{Formula 3}$$

Next, the channel processor 34 checks whether or not the distribution processing should be executed (SP33). If it is judged that the dispersion procession should not be executed for the current write request (SP33: NO), the channel processor 34 terminates the distribution processing—even if it has been judged in the routine RT3 that the distribution processing can be executed without problems, executes the regular write processing routine RT8 (explained later), and ends the routine RT4 shown in FIG. 14 (SP34). Meanwhile, if it is judged that the distribution processing should be executed for the current write request (SP33: YES), the channel processor 34 executes the allocation target channel processor selection processing routine RT5 (explained later) and the distribution processing routine RT6, and ends the routine RT4 shown in FIG. 14 (SP34).

Figure 15:
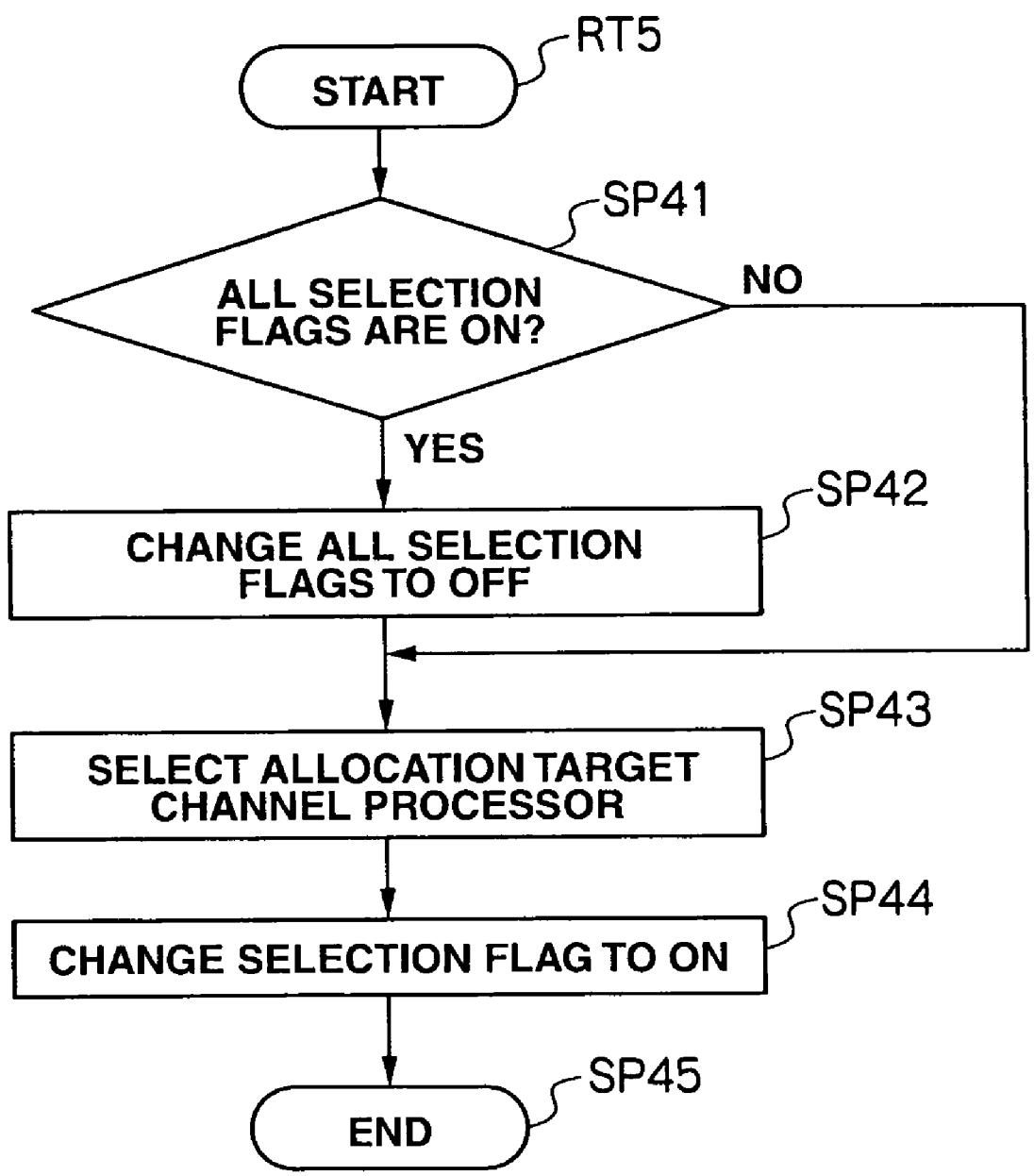
FIG. 15 is a flowchart showing an allocation target channel processor selection processing routine.

FIG. 15 shows an example of a flowchart showing a specific routine relating to the allocation target channel processor selection processing performed by the channel processor 34 in the storage apparatus 4 in the storage system 1.

If it is judged that the distribution processing should be executed, the channel processor 34 executes, according to the allocation target channel processor selection processing routine RT5 shown in FIG. 15, the allocation target channel processor selection processing program, included in the distribution processing program 57, for selecting the channel processor the processing is allocated to, and checks whether or not all selection flags are ON by referring to the external channel processor response time table 52 (SP41).

If not all selection flags are ON (SP41: NO), the processing proceeds to step SP43. Meanwhile, if all selection flags are ON (SP41: YES), all channel processors 34 have been selected once. Accordingly, all selection flags are shifted to OFF so that all of them can be selected as allocation targets (SP42).

Then the channel processor 34 refers to the acceptance prohibition information table 41 and allocation prohibition information table 42 to check the channel processors 34 with acceptance prohibition and allocation prohibition flags both OFF, and also refers to the external channel processor response time table 52 to check the channel processors 34 with selection flags OFF. The channel processors 34 with reception prohibition and allocation prohibition flags both OFF and selection flags also OFF are selected as allocation target channel processors 34 in the order of shorter regular write average external response time compared with the regular write average internal response time (SP43).

Subsequently, the channel processor 34 shifts the selection flag corresponding to the allocation target channel processor 34 to ON (SP44).

After that, the channel processor 34 ends the routine RT5 shown in FIG. 15 (RT45).

In this embodiment, if several channel processors 34 execute the routine RT5 at the same time, each of those channel processors 34 executes the routine RT5 at slightly different points in time so that allocation for distribution processing from several channel processors 34 is not concentrated on a single channel processor 34 with a short internal channel processor response time.

By doing so, any sudden increase in the internal channel processor response time caused by several requests being allocated from other channel processors 34 can be prevented.

Figure 16:
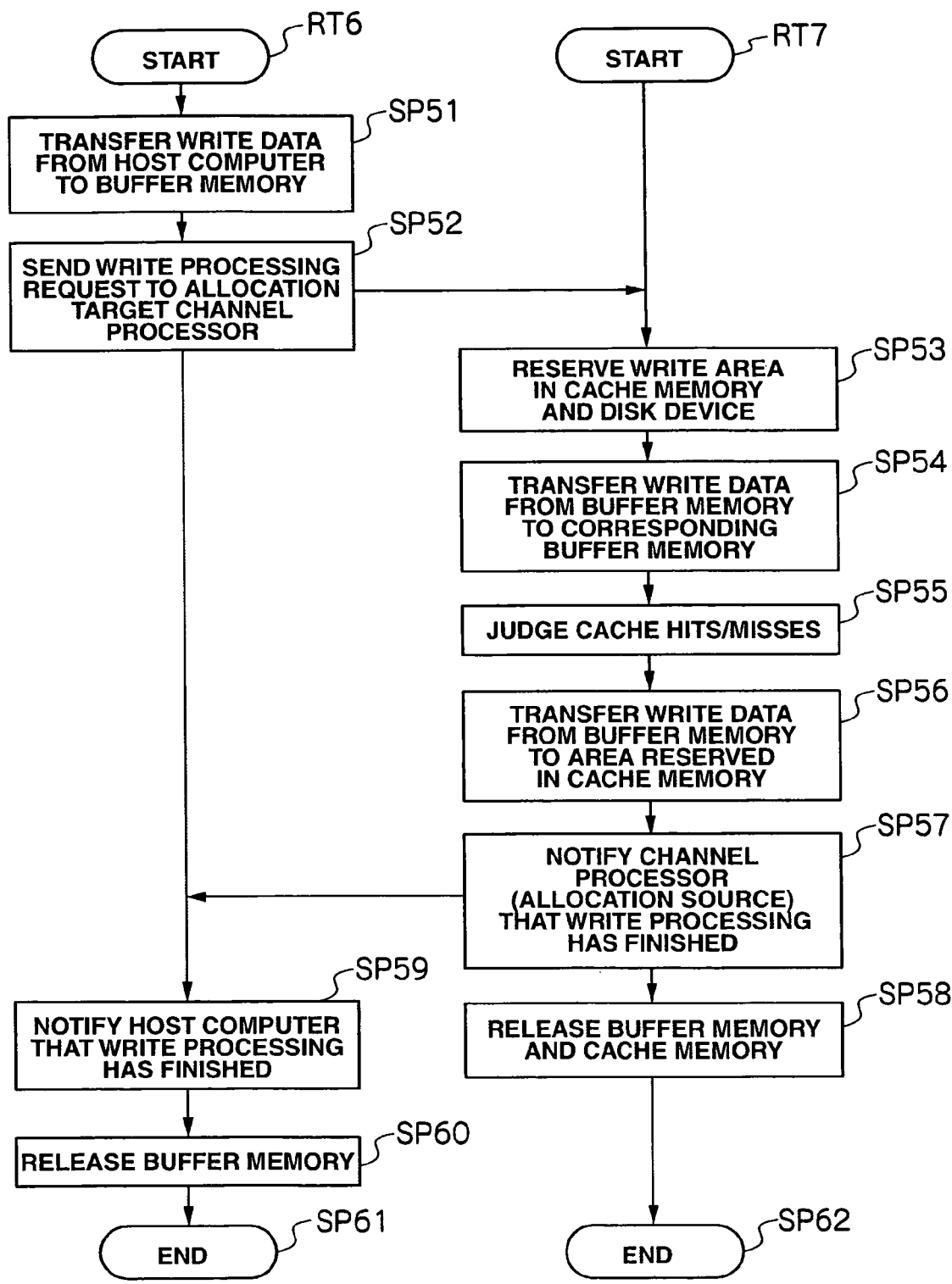
FIG. 16 is a flowchart showing a distribution processing routine.

FIG. 16 shows an example of a flowchart showing a specific routine relating to distribution processing performed by the channel processor 34 in the storage apparatus 4 in the storage system 1.

After the allocation target channel processor 34 is selected, the channel processor 34 executes the distribution program included in the distribution processing program 57 according to the distribution processing routine RT6 shown in FIG. 16, and transfers write data relevant to the write request sent from the host computer 2 to the buffer memory 33 corresponding to the allocation target channel processor 34 via the interface unit 31 and the channel adapter connector 32 (SP51).

Next, the channel processor 34 issues a write processing request and sends the request to the allocation target channel processor 34 (SP52). If the channel processor 34 performing the processing and the allocation target channel processor 34 share the same buffer memory 33, the write request is sent to the allocation target channel processor 34 via that buffer memory 33. If those channel processors 34 are in the same channel adapter 11 but do not share the same buffer memory 33, the write request is sent to the allocation target channel processor 34 via the buffer memory 33 connected to the channel processor 34 performing the processing, the channel adapter connector 32, and the buffer memory 33 connected to the allocation target channel processor 34. If the allocation target channel processor 34 is not in the same channel adapter 11, the write processing request is sent to the allocation target channel processor 34 via the buffer memory 33, the channel adapter connector 32, and the internal connection terminal 36 in the channel adapter 11 including the channel processor 34 performing the processing, the connector 12, and the internal connection terminal 36, the channel adapter connector 32, and buffer memory 33 in the channel adapter 11 including the allocation target channel processor 34.

The allocation target channel processor 34, after receiving the write processing request from the channel processor 34 (allocation source), executes a request processing program for interpreting the write processing request and executing the relevant processing according to a request processing routine RT7 shown in FIG. 16, and reserves a write area in the cache memory 14 and disk device 21 (SP53).

Subsequently, the allocation target channel processor 34 transfers the write data from the buffer memory 33 connected to the channel processor 34 (allocation source) to the buffer memory 33 connected to the allocation target channel processor 34 (SP54).

If the channel processor 34 (allocation source) and the allocation target channel processor 34 share the same buffer memory 33, the allocation target channel processor 34 does not have to transfer the write data. If those channel processors 34 are in the same channel adapter 11 but do not share the same buffer memory 33, the write data is transferred to the buffer memory 33 connected to the allocation target channel processor 34 via the buffer memory 33 connected to the channel processor 34 (allocation source) and the channel adapter connector 32. If the allocation target channel processor 34 and the channel processor 34 (allocation source) are not in the same channel adapter 11, the allocation target channel processor 34 monitors that the channel processor 34 (allocation source) stores the write data in a working slot in the cache memory 14, and transfers, after the write data is stored in the working slot in the cache memory 14 by the channel processor 34 (allocation source), the write data to the buffer memory 33 connected to the allocation target channel processor 34 via the connector 12, the internal connection terminal 36, and the channel adapter connector 32.

Next, the allocation target channel processor 34 judges cache hits/misses (SP55). In this step, since the write area has already been reserved in the cache memory 14 in step SP53, the allocation target channel processor 34 can always find cache hits.

Next, the allocation target channel processor 34 transfers the write data to the write area reserved in the cache memory 14 from the buffer memory 33, via the channel adapter connector 32, the internal connection terminal 36, and the connector 12 (SP56).

Then, the allocation target channel processor 34 notifies the channel processor 34 (allocation source) that the write processing is finished (SP57). In this step, the allocation target channel processor 34 sends the notice via the opposite route to the route in step SP52, according to the location of the channel processor 34 (allocation source).

Next, the allocation target channel processor 34 releases the buffer memory 33 and the write area that has been reserved in the cache memory 14 (SP58), and ends the routine RT7 shown in FIG. 16 (SP62).

Meanwhile, the channel processor 34 (allocation source), after receiving notice indicating the end of the write processing from the allocation target channel processor 34, notifies the host computer 2 of the same via the buffer memory 33, the channel adapter connector 32, and the interface unit 31 (SP59).

Subsequently, the channel processor 34 (allocation source) releases the buffer memory 33 (SP60), and ends the routine RT6 shown in FIG. 16.

FIG. 17 shows an example of a flowchart showing a specific routine relating to the regular write processing performed by the channel processor 34 in the storage apparatus 4 in the storage system 1.

If it is judged that the distribution processing should not be executed at present, or should not be executed for the current request, the channel processor 34 executes the request processing program 56 according to the regular write request processing routine RT8 shown in FIG. 17, and transfers the write data relevant to the write request sent from the host computer 2 to the buffer memory 33 connected to the channel processor 34 via the interface unit 31 and the channel adapter connector 32 (SP71).

Next, the channel processor 34 reserves a write area in the cache memory 14 and the disk device 21 (SP72).

Then, the channel processor 34 judges cache hits/misses (SP73). Since the write area has already been reserved in the cache memory 14 in step SP71, the channel processor can always find cache hits.

Subsequently, the channel processor 34 transfers the write data to the write area reserved in the cache memory 14 from the buffer memory 33 via the channel adapter connector 32, the internal connection terminal 36, and the connector 12 (SP74).

Next, the channel processor 34 notifies the host computer 2 that the write processing is finished, via the buffer memory 33, the channel adapter connector 32, and the interface unit 31 (SP75).

The channel processor 34 then releases the buffer memory 33 and the write area that has been reserved in the cache memory 14 (SP76), and ends the routine RT8 shown in FIG. 17 (SP77).

In that way, after a channel processor 34 receives a write request sent from the host computer 2, the storage apparatus 4 in the storage system 1 judges whether or not to execute the processing for allocating processing relevant to the request from that channel processor 34 to another channel processor 34. If execution of distribution processing is selected, an allocation target channel processor 34 is selected.

Accordingly, it is possible to effectively prevent the response time taken from the reception of a write request from the host computer 2 until issue of a notice indicating the write data relevant to the write request is complete longer than it would were the channel processor 34 that received the request to complete the processing by itself, due to the overhead caused by the distribution loss that occurs during the load distribution processing.

Since the allocation target channel processor 34 is selected based on the external channel processor response times in the respective channel processors 34, the processing relevant to the request can be allocated to the channel processor 34 with a short external channel processor response time, even if that channel processor 34 operates at a high operating rate. Moreover, the number of allocations can be varied depending on the types of requests, so the processing for the requests can be optimized even when various requests are sent at the same time.

In this embodiment, conceivable factors that may affect the response time are a queue in the channel processor, a response made by the cache memory, a queue in the disk adapter, a response made by the disk device, a response concerning the remote copy, and a response concerning MRCF, etc.

In this embodiment, if the type of job is frequently changed, an effective allocation target channel processor may not be able to be selected. Therefore, the storage system 1 may be modified so that an operator can manually select whether or not to execute distribution processing. As a modified example of the above described allocation prohibition response time and allocation resumption response time, the distribution processing may be terminated when the storage apparatus has received requests from a prescribed or larger number of host computers, and may resume the processing after the number of requests has decreased. The management terminal, which has information about which host computer is connected to which channel adapter, may also be referred to.

In the above described embodiment, requests are allocated due to distribution processing to any of the channel processors included in the storage system 1. However, the present invention is not limited to that, and distribution processing groups may be defined so that the distribution processing is performed only within the same group. The group definition may be performed by using the channel processor IDs belonging to the same group.

The present invention can be widely used in storage apparatuses having plural independent controlling elements.

What is claimed is:

1. A storage apparatus having plural control processors that interpret and process a request sent from a host computer, the storage apparatus comprising:

each of the control processors comprising:
   a respective cycle processing unit for calculating average response time for the processing in the respective control processor during a prescribed time cycle;
   a distribution judgment unit for judging, after a control processor receives a request sent from the host computer, whether or not to allocate processing relevant to the request from that control processor to any other control processor; and
   a control processor selection unit configured for selecting an allocation target control processor if the distribution judgment unit decides to allocate the processing to another control processor, wherein the control processor selection unit of a first control processor of the plural control processors is configured to allocate, in the case in which the first control processor receives the request from the host computer and the distribution judgment unit of the first control processor judges to allocate the processing relevant to the request to another control processor, the processing relevant to the request to the another of the control processors based at least in part on the average response time of the first control processor and on the average response time of the another control processor, wherein the cycle processing unit also is configured to determine a total number of requests received by the control processor and a number of allocations of processing relevant to the requests to any other of the control processors during a prescribed time cycle, wherein the distribution judgment unit is configured to judge whether or not to allocate the processing relevant to the request to another control processor based on the total number of requests received by the control processor and the number of allocations of processing relevant to the requests to any other of the control processors during the prescribed time cycle, and wherein the distribution judgment unit of the first control processor is configured to prohibit allocation of the processing to a second one of the control processors if the average response time for the processing in the second control processor exceeds a first threshold, and makes the second control processor resume accepting allocation from the first control processor if the average response time for the processing in the first control processor exceeds a second threshold.

2. The storage apparatus according to claim 1, wherein the distribution judgment unit decides a total number of allocations of the processing relevant to the request to another control processor based on the average response time for the processing in the control processor that received the request during a prescribed time cycle.

3. The storage apparatus according to claim 2, wherein the distribution judgment unit calculates a number of allocations of the processing relevant to each type of request made to any other of the control processors based on a number of received requests of each type and the total number of allocations of the requests to any other of the control processors.

4. The storage apparatus according to claim 1, wherein the control processor selection unit is configured to select the allocation target control processor from among the control processors other than the control processor that received the request, in the order of shorter average response time for the processing.

5. The storage apparatus according to claim 4, wherein the control processor selection unit is configured not to select again any control processor already selected once before until all control processors that can be allocation targets have been selected.

6. A load distribution method for a storage apparatus having plural control processors that interpret and process a request sent from a host computer, the method comprising:

a first step of calculating an average response time for the processing in the respective control processor during a prescribed time cycle;

a second step of judging, after a first control processor receives a request sent from the host computer, whether or not to allocate processing relevant to the request from the first control processor that received the request to another control processor; and a third step of selecting an allocation target control processor if the processing allocation is decided upon in the second step;

wherein the selecting step comprises, in the case in which the judging step judges to allocate the processing relevant to the request to another control processor, selecting the another of the control processors for the processing relevant to the request, based at least in part on the average response time of the first control processor and on the average response time of the another control processor, wherein in the second step, whether or not to allocate the processing relevant to the request to any other of the control processors is determined based on a total number of requests received by the first control processor and a number of allocations of the processing relevant to the requests to any other of the control processors during the prescribed time cycle, and wherein in the second step, allocation of the processing to a second one of the control processors is prohibited if the average response time for the processing in the second control processor exceeds a first threshold, and acceptance of allocation of the processing to the second control processor is resumed if the average response time for the processing in the first control processor exceeds a second threshold.

7. The load distribution method according to claim 6, wherein in the second step, the total number of allocations of the processing relevant to the requests to another of the control processors is determined based on average response time for the processing in the first control processor that received the request during the prescribed time cycle.

8. The load distribution method according to claim 7, wherein in the second step, the number of allocations of the processing relevant to each type of request to any other of the control processors is calculated based on a number of received requests of each type and a total number of allocations of the requests to another control processor.

9. The load distribution according to claim 6, wherein in the third step, the allocation target control processor is selected from among the control processors other than the control processor that received the request, in the order of shorter average response time for the processing.

10. The load distribution method according to claim 9, wherein in the third step, any control processor already selected once before is not selected again until all control processors that can be allocation targets have been selected.

* * * * *